US012614456B2

(12) United States Patent
Crona et al.

(10) Patent No.: US 12,614,456 B2
(45) Date of Patent: Apr. 28, 2026

(54) GUIDING AUTONOMOUS VEHICLES

(71) Applicant: XENSE Vision AB, Jönköping (SE)

(72) Inventors: Björn Crona, Jönköping (SE);
Christian Karlström, Jönköping (SE);
Ibraheem Khaleel Al-Nuaimi,
Jönköping (SE); Andreas Ternstedt,
Jönköping (SE); Göran Boström,
Huskvarna (SE); Claes Markström,
Jönköping (SE); Nils Jonsson Lindahl,
Jönköping (SE)

(73) Assignee: XENSE Vision AB, Jönköping (SE)

( * ) Notice: Subject to any disclaimer, the term of this
patent is extended or adjusted under 35
U.S.C. 154(b) by 98 days.

(21) Appl. No.: 18/584,491

(22) Filed: Feb. 22, 2024

(65) Prior Publication Data

US 2024/0290203 A1      Aug. 29, 2024

(30) Foreign Application Priority Data

Feb. 24, 2023      (EP) ..................................... 23158549

(51) Int. Cl.
*G08G 1/0968*          (2006.01)
*B60W 30/095*          (2012.01)
(Continued)

(52) U.S. Cl.
CPC ...  *G08G 1/096811* (2013.01); *B60W 30/0953*
(2013.01); *B60W 60/001* (2020.02);
(Continued)

(58) Field of Classification Search
CPC ........... B60W 30/0953; B60W 60/001; B60W
2554/404; B60W 2554/804;
(Continued)

(56) References Cited

U.S. PATENT DOCUMENTS 11,022,450 B2 *  6/2021  Iagnemma ........... G07C 5/0808
11,242,051 B1 *  2/2022  Konrardy ......... G08G 1/096725
(Continued)

FOREIGN PATENT DOCUMENTS

AU          2024227350 A1 *  5/2025
CA            3202422 A1 *  12/2023   .............. B60L 58/13
(Continued)

OTHER PUBLICATIONS

European Search Report for co-pending EP Application No. 23158549.
8, dated Jul. 20, 2023, 8 pp.
(Continued)

*Primary Examiner* — Atul Trivedi
(74) *Attorney, Agent, or Firm* — Kagan Binder, PLLC

(57) ABSTRACT

A system and method for guiding at least one autonomous
vehicle within an area, the system comprising: 3D-measur-
ing means configured to detect the at least one autonomous
vehicle and at least one object within the area, identifying
means configured to obtain an identity of the at least one
autonomous vehicle, aggregating means configured to
aggregate information of the position and movement of the
at least one autonomous vehicle, processing means config-
ured to generate a set of instructions for the at least one
autonomous vehicle, based on a total driving efficiency for
said at least one autonomous vehicle and at least one
additional vehicle and transmitting means configured to
transmit the set of instructions for guiding the at least one
autonomous vehicle.

16 Claims, 4 Drawing Sheets

(51) Int. Cl.
 *B60W 60/00* (2020.01)
 *G08G 1/01* (2006.01)
(52) U.S. Cl.
 CPC ......... *G08G 1/0125* (2013.01); *G08G 1/0141*
  (2013.01); *B60W 2554/404* (2020.02); *B60W*
  *2554/804* (2020.02); *B60W 2556/45* (2020.02)
(58) Field of Classification Search
 CPC ............. B60W 2556/45; G08G 1/0116; G08G
  1/0125; G08G 1/0133; G08G 1/0141;
  G08G 1/0145; G08G 1/096725; G08G
  1/0968; G08G 1/096811; G08G 1/164;
  G05D 7/0635
 USPC ........................................................... 701/24
 See application file for complete search history.

(56) References Cited

U.S. PATENT DOCUMENTS

| | | | | |
|---|---|---|---|---|
| 11,441,916 | B1 * | 9/2022 | Konrardy | ............. G01C 21/343 |
| 11,472,291 | B2 * | 10/2022 | Alalao | ................... B60K 35/28 |
| 2020/0242922 | A1 | 7/2020 | Dulberg et al. | |
| 2021/0248915 | A1 * | 8/2021 | Jacobus | ................... H04W 4/02 |
| 2021/0261159 | A1 * | 8/2021 | Pazhayampallil | .... B60W 30/09 |
| 2021/0394797 | A1 | 12/2021 | Ran et al. | |
| 2022/0005291 | A1 * | 1/2022 | Konrardy | ......... B60W 60/0015 |
| 2022/0034678 | A1 * | 2/2022 | Chintakindi | ....... G01C 21/3484 |
| 2022/0114885 | A1 * | 4/2022 | Ran | ...................... B60W 60/00 |
| 2022/0135039 | A1 * | 5/2022 | Jardine | ........... B60W 30/18163 |
| | | | | 701/26 |
| 2022/0340138 | A1 * | 10/2022 | Seegmiller | ......... B60W 30/045 |
| 2022/0348227 | A1 * | 11/2022 | Foster | .................... B60Q 1/507 |
| 2022/0365540 | A1 | 11/2022 | Rosales et al. | |
| 2022/0375336 | A1 | 11/2022 | Ran et al. | |
| 2023/0012196 | A1 * | 1/2023 | Abundis Vargas | ......................... |
| | | | | G08G 1/096716 |
| 2023/0020966 | A1 * | 1/2023 | Foster | ............... B60W 60/0015 |
| 2023/0030815 | A1 * | 2/2023 | Happold | ............ B60W 50/023 |
| 2023/0037767 | A1 * | 2/2023 | Yang | ...................... G08G 1/167 |
| 2024/0246537 | A1 * | 7/2024 | Kurutach | ........ B60W 60/00274 |
| 2024/0246573 | A1 * | 7/2024 | Kurutach | ........ B60W 30/18154 |
| 2025/0018947 | A1 * | 1/2025 | Yuan | ................. B60W 60/0015 |
| 2025/0108839 | A1 * | 4/2025 | Caldwell | ............... G06N 5/022 |
| 2025/0115271 | A1 * | 4/2025 | Zhou | ................... B60W 60/001 |
| 2025/0131819 | A1 * | 4/2025 | Yuan | ........................ G08G 1/08 |
| 2025/0140027 | A1 * | 5/2025 | Liu | ....................... G06N 3/0455 |
| 2025/0171017 | A1 * | 5/2025 | Chen | .............. B60W 30/18163 |
| 2025/0180368 | A1 * | 6/2025 | Abdulsaid | .............. G07C 5/004 |
| 2025/0187635 | A1 * | 6/2025 | Parasuram | ............ G06N 3/045 |
| 2025/0214607 | A1 * | 7/2025 | Holloway | ........... B60W 40/107 |
| 2025/0214608 | A1 * | 7/2025 | Dang | .................... G06N 20/00 |
| 2025/0217989 | A1 * | 7/2025 | Wang | ........................ G06T 7/60 |
| 2025/0222949 | A1 * | 7/2025 | Lin | ..................... G06F 11/3013 |
| 2025/0224236 | A1 * | 7/2025 | Kabalar | ............... G08G 1/0112 |
| 2025/0225874 | A1 * | 7/2025 | Yang | ................... G08G 1/0112 |

FOREIGN PATENT DOCUMENTS

| | | | | | |
|---|---|---|---|---|---|
| EP | | 4421775 | A1 * | 8/2024 | .......... G08G 1/0141 |
| GB | | 2604425 | A * | 9/2022 | .......... B60W 30/146 |
| GB | | 2632656 | A * | 2/2025 | ........... B60W 30/09 |
| JP | | 7001628 | B2 * | 1/2022 | .......... G06V 20/586 |
| JP | | 7194186 | B2 * | 12/2022 | ............. G08G 1/147 |
| KR | 20220118292 | A * | 8/2022 | ......... G01C 21/3407 |
| WO | WO-2020205648 | A1 * | 10/2020 | ............. G06N 20/00 |
| WO | WO-2022226373 | A1 * | 10/2022 | ............. G06N 3/092 |

OTHER PUBLICATIONS

Communication Pursuant to Article 94(3) EPC for co-pending EP23158549,8, 6 pp., Sep. 18, 2025.

\* cited by examiner

GUIDING AUTONOMOUS VEHICLES

CROSS REFERENCE TO RELATED APPLICATIONS

This application claims priority to European Application No. 23158549.8, filed Feb. 24, 2023 and titled "GUIDING AUTONOMOUS VEHICLES," which is incorporated herein by reference in its entirety.

TECHNICAL FIELD OF INVENTION

The invention relates to a system and method for guiding autonomous vehicles based on positioning measurements in real time.

BACKGROUND

Developments in the automotive industry all over the world is currently stimulating a transition from solely driver controlled vehicles toward various stages of autonomous vehicles. There are already vehicles with a lower level of autonomy commercially available on the market. These include driver assist systems, such as lane assist, parking assist and dynamic cruise control. In the highest level of autonomy these systems are intended to eliminate the human monitoring and interference completely.

Traditionally, the human driver has perceived the environment with biological senses and maneuvered the vehicle according to decisions taken based on this information. In comparison, the autonomous vehicle is equipped with sensors, such as radar and ultrasonic, to detect the environment and monitor distances to nearby objects. Simultaneously, cameras detect traffic signs and other visual information and GPS is used to position the vehicle in a larger scale.

Each vehicle, autonomous or with a human driver, makes traffic decisions individually, and the surrounding traffic participants have to make their individual decisions accordingly. To aid in this process and to promote a safe and more optimized traffic situation, the human drivers have traffic rules, traffic customs and communication tools, such as of eye contact, lane placement and indicators. However, traffic is far from optimized and the human error plays a part in many accidents. Autonomous vehicles have improved reaction time relative to human drivers and make sophisticated calculations. However, fleets of autonomous vehicles of today do have far from optimal driving efficiency, regarding e.g., safety and fuel consumption and the performance of mixed fleets of autonomous and conventional vehicle is even poorer. There is therefore a need of a system which facilitates the driving efficiency of mixed fleets and fleets of autonomous vehicles within traffic areas.

SUMMARY OF THE INVENTION

It is an object of the present inventive concept to provide a system and a method for guiding at least one autonomous vehicle within an area.

According to one aspect of the inventive concept, there is provided a system for guiding at least one autonomous vehicle within an area. The system comprises 3D-measuring means configured to detect the at least one autonomous vehicle and at least one object within the area, and the position and movement of the at least one autonomous vehicle and the at least one object, identifying means configured to obtain an identity of the at least one autonomous vehicle, aggregating means configured to aggregate information of the position and movement of the autonomous vehicle and the at least one object with a road map of the area and processing means configured to generate a set of instructions for the at least one vehicle, based on a total driving efficiency for said at least one autonomous vehicle and at least one additional vehicle. The total driving efficiency is based on the aggregated information of the position and movement of the at least one autonomous vehicle and the at least one object. The system further comprises transmitting means configured to transmit the set of instructions for guiding the at least one autonomous vehicle.

With the present invention, the total driving efficiency for said at least one autonomous vehicle and the at least one additional vehicle is increased.

The system has the capability to improve the total driving efficiency of a plurality of vehicles in the area. This is in contrast to existing systems for autonomous vehicles which operate outgoing from efficiencies of individual vehicles, considering information detected by one single vehicle, e.g., so as the fuel consumption of that vehicle is decreased, and so that vehicle drives safer. With the system of the present invention, instructions are given which may be adapted to improve the overall efficiency of a plurality of vehicles in the area, more than what would be by optimizing the efficiency of every vehicle individually. The traffic in the area is thereby facilitated by the system. For example, on a motorway ramp, one first autonomous vehicle may be instructed to decrease its speed for another autonomous vehicle to enter the lane, which may increase the total traffic flow but delay the first vehicle, to some extent. However, at another spot the first vehicle may benefit from the system, so through a broad implementation of the system, all vehicles may benefit. Moreover, conventional vehicles may also benefit from the manner by which the autonomous vehicles drive, which follow the instructions given by the system. The system is able to generate instructions to autonomous vehicles to which it is connected and thereby it is able to be increasingly implemented when the number of connected autonomous vehicles is increased in the area. The system may result in less accumulation of queues.

According to one embodiment, total driving efficiency comprises at least one of fuel consumption, traffic flow, speed steadiness, traffic through-put of the area, safety parameters, experienced and real safety for vulnerable road users, accessibility for prioritized vehicles, such as buses and/or emergency vehicles and parking efficiency.

Traffic flow at one spot of the area refers to how many vehicles that passes it per time unit. By decreasing fuel consumption, the economic and environmental sustainability of the vehicles is improved. For electric vehicles the total driving efficiency may comprise electric energy efficiency. The safety parameters may relate to risk for collision with another vehicle or with any obstacle, breaking distance and expected collision speed, in case a collision would occur, e.g., because of an unexpected instant braking of a vehicle ahead. By vulnerable road users it is meant cyclists, motorcyclists, pedestrians and other unprotected users such as wheelchair users. The experienced safety for vulnerable road users may relate to speed of vehicles in the vicinity of said vulnerable road users.

By parking efficiency, it may be meant area density of parked vehicles and/or access to parking spots compared to required movements by the at least one autonomous vehicle and the additional vehicle. Further, autonomous vehicles without passengers may be instructed to park very closely to each other and in several rows, resulting in a higher parking efficiency.

If optimized based on prioritized vehicles the system may be configures to give passage to a bus with a plurality of passengers, or an emergency vehicle such as an ambulance, police or fire truck to let the aid reach the destination in time. It can also involve delivery of important (prioritized) deliveries such as food or other time sensitive deliveries.

The autonomous vehicle may be any vehicle that is capable of autonomous driving, e.g., an autonomous car truck or delivery robot.

In one embodiment, the at least one additional vehicle may be e.g., a car, truck, bike or e-scooter.

The at least one object may as well be a vehicle but may as well be a road structure object, a vulnerable road user, or any other object that may interfere with the traveling path of the at least one autonomous vehicle.

In one embodiment, the additional vehicle may be a second autonomous vehicle and the processing means may be configured to generate a second set of instructions to said second autonomous vehicle.

In one embodiment, the 3D measuring means comprise stereo cameras, radar, time of flight cameras or a LIDAR system. The 3D measuring means may, as well, be based on any other present or future technologies. The 3D measuring means may consist of several devices and may comprise a computing device which processes measured material.

In one embodiment the aggregation means it may be one or several devices with computing power. The aggregation means may be a server or a computer and consist of one or several devices. The processing means may, as well, comprise one or several linked devices with computing power. The aggregation means and processing means may be the same or different devices.

In some embodiments, the identifying means and 3D measuring means may, as well, be the same or different devices.

The identifying means may alternatively be a device which receives, directly or indirectly, a wireless signal from the at least one autonomous vehicle by which its identity may be obtained. Such wireless signal may be any signal capable of transmitting the identity of the vehicle.

The aggregated data may together with a road map form a projection model over the area specifying a position and movement of vehicles on the road map. By projection model it is meant a model of a current position and movement of the autonomous vehicle and possibly other vehicles in the area. Additional data may be aggregated into the projection model about said autonomous and other vehicles in the area such as their size, type, model and weight.

Regarding additional vehicles, it may be specified whether they are autonomous and if so, whether they are connected to the system and have been identified by the identifying means and specifications derivable from the identification of said vehicles.

The road map may describe the infrastructural network of the area, such as road courses, lanes, road width, traffic regulations including speed limits, signs, traffic lights, intersections, roundabouts, parking spots, ramps, and exits of motorways. Some of this information may be pre-entered and some may be imaged by the 3D measuring means. Information from 3D measurements of traffic interfering objects, including their position and motion are aggregated into the aggregated data. By movement it is meant speed and direction of travel. The aggregated data may be stored on a hard drive or a server and may be available online. Some of the entire aggregated data may be made available to computing systems of autonomous vehicles. Based on the aggregated data, the state of the traffic of the area may be displayed as a, continuously or repeatedly, updated map onto displaying means e.g., in autonomous vehicles or at a traffic management center. The traffic network of the aggregated data may be updated manually, e.g., if the road system is changed, or if a road maintenance project is introduced and/or by the 3D measurement system recognizing any change in the state of the network.

The 3D measuring means may image the area with a sufficiently high frequency to give a sufficiently reliable imaging and frequency to support decision making which implies interaction with other vehicles.

In one embodiment, the identifying means are configured to obtain said identity of the at least one autonomous vehicle through 3D imaging, imaging at least one attribute such as color or shape of said autonomous vehicle or by receiving positioning data from the at least one vehicle. The identifying means may be provided with attributes of different autonomous vehicles such as their color and shape and identify the vehicle by recognition of such attributes through said imaging.

In one embodiment, the identifying means are configured to receive wirelessly transmitted identifying information from the autonomous vehicles.

The identifying means may further relate and identify a vehicle as an object imaged by the 3D imaging means.

The processing means may estimate traffic parameters outgoing from the aggregated data, such as current traffic flow and total fuel or energy consumption of the at least one autonomous and the at least one additional vehicle. The processing means may further estimate a safety parameter such as risk for collision if one vehicle unexpectedly would break or change direction.

In one embodiment, the system further comprises receiving means configured to receive an intended driving route from said at least one autonomous vehicle and the set of instructions may further be generated based on said intended driving route. The autonomous vehicle may determine the intended driving route, including intended speed and direction of travel for a following time period, and transmit information thereabout to the system.

In one embodiment, the receiving means are configured to receive an intended driving route from a plurality of vehicles, the aggregation means are configured to aggregate the intended driving routes from said plurality of vehicles and the processing means are configured to base the set of instructions for the at least one autonomous vehicle also on intended driving routes from vehicles that are not guided by the system.

In one embodiment, the autonomous vehicle is a first autonomous vehicle, and the set of instructions is a first set of instructions, wherein the system is further configured to transmit a second set of instructions to a second autonomous vehicle based on said intended driving route and configured to give the second autonomous vehicle a choice to accept the set of instructions and to further generate the first set of instructions for the first autonomous vehicle based on said choice.

Thereby, the second autonomous vehicle may assess outgoing from perception devices of that vehicle whether to follow said second set of instructions. For example, if the first vehicle intends to turn left in an intersection and the second vehicle drives in the opposite direction, the second set of instructions may comprise an instruction for the second autonomous vehicle to decrease its speed enabling the first vehicle to turn left at a specific time. Whether the second vehicle accepts the second set of instructions may determine at what time it is suitable for the first vehicle to make the left turn and therefore the first set of instructions may be based on said choice made by the second autonomous vehicle regarding the second set of instructions.

In one embodiment, the system further comprises forecasting means configured to forecast the evolvement of the traffic of the area outgoing from said aggregated information and said intended driving route and wherein said set of instructions further are generated based on said forecasted evolvement of the traffic.

In one embodiment, the forecasted evolvement is estimated based on imaging the movement of the at least one autonomous, the at least one additional vehicle, said at least one object and machine learning based on the imaged movement so as to correlate the set of instructions with the forecasted evolvement.

The system may calculate indicators regarding traffic efficiency for said forecasted evolvement. The generated instructions may specify a route with higher driving efficiency than for the intended driving route considering an associated forecasted evolvement.

In one embodiment, the set of instructions and/or the intended driving route comprise a continuously varying direction and speed for a vehicle or a list of directions and speeds together with corresponding time points during a time interval.

In one embodiment, the autonomous vehicles detect the traffic in their surrounding through sensors and transmits information thereabout to the system.

The processing means generate, for the autonomous vehicles, instructions for which the forecasted evolvement and/or safety parameters are improved, given that they are followed. The instructions may be generated prioritizing safety, e.g., instructions may always be forecasted to benefit the safety of the area. Secondarily, traffic flow and fuel consumption may be considered. The instructions may be transmitted through transmitting means to the autonomous vehicles.

In one embodiment, the at least one autonomous vehicle is capable of remote steering and the system is configured to select or give a passenger of the vehicle the possibility to select whether to accept the instructions and wherein the system is configured to cause the autonomous vehicle to follow said instructions only if they are accepted. The selection may be made through preset instructions, specifying to what extent and how the autonomous vehicle should follow the set of instructions.

In one embodiment, a choice relating to the set of the instructions may be given to a human passenger or driver of the autonomous vehicle by being displayed on a screen. The passenger may e.g., select whether to decrease the speed to facilitate a left turn for an oncoming vehicle.

The autonomous vehicles may be capable of remote steering and be set to follow said instructions. Alternatively, the autonomous vehicle may provide a passenger of the vehicle to select whether to follow a set of instructions. The autonomous vehicles may further have a manual mode so as to be capable of being driven as a conventional vehicle and have different autonomous modes of which some implies remote steering according to said instructions.

The instructions may specify exactly what direction and with what speed the vehicle shall drive at given time points.

The system may be able to facilitate the traffic of both fleets with only autonomous vehicles and mixed fleets of both autonomous and conventional vehicles.

In one embodiment, the area comprises at least one of a parking lot, an intersection, a roundabout and/or a motorway ramp a tunnel, bridge or any other continuous road stretch.

The system may forecast the evolvement of the traffic along with traffic and safety parameters, based on said aggregated information and intended driving route. The system may be configured to display the forecasted evolvement of the traffic on displaying means.

The system may further forecast several alternatively evolvements of the traffic and generate a set of instructions which correlates to an evolvement for which the traffic efficiency is higher than for a forecasted evolvement for which the set of instructions is not generated.

In one embodiment, the 3D measuring means further are configured to measure the dimensions of the at least one autonomous vehicle and the at least one object and wherein the system is configured to determine whether the at least one object is a vehicle and in such case what type of said vehicle such as truck, car, E-scooter, bicycle and wherein the aggregation means further are configured to aggregate object information thereabout, wherein the set of instructions further are generated based on said object information.

In one embodiment, the system further is configured to determine which of the objects that are, vehicles and which that are pedestrians or vulnerable road user. The system may be able to identify which that are extra vulnerable road users, such as wheelchair users, elderly people and children and the aggregation means may be configured to aggregate said measured road users along with the type of each road user. By considering other road users, the safety for them may be considered for the generation of instructions and the safety may thereby also be improved by the system.

According to a second aspect of the present inventive concept, there is provided, a method for guiding at least one autonomous vehicle within an area, the method comprising: detecting at least one autonomous vehicle and at least one object within the area and its position and movement by 3D measuring, obtaining the identity of the at least one vehicle aggregating information of the position and movement of the autonomous vehicle with a road map of the area and guiding identified autonomous vehicles in the system by generating a set of instructions to the at least one vehicle based on a total driving efficiency for said at least one autonomous vehicle and said at least one additional vehicle.

The method implies the same benefits for the area as the described system. The traffic efficiency, e.g., safety, fuel consumption and traffic through-put are improved for the at least one autonomous vehicle and the at least one additional vehicle. The autonomous vehicle may be detected by, e.g., stereo cameras or a LIDAR system. Detecting and obtaining the identity of said vehicle and aggregating said information along with a road map gives a basis for estimating a traffic efficiency relating to said vehicle. By guiding the vehicle said traffic efficiency is improved.

In one embodiment, the method further comprises the step of receiving an intended driving route from the at least one autonomous vehicle and wherein the set of instructions are generated further based on said intended driving route.

In one embodiment, the method further comprises a step of selecting whether to accept or reject the set of instructions and a step of causing the autonomous vehicle to follow the suggestions through remote steering in case of the suggestions being accepted.

In one embodiment, the method further comprises a step of forecasting the evolvement of the traffic of the area outgoing from said aggregated information and said intended driving route and wherein said set of instructions further are generated based on said forecasted evolvement of the traffic.

In one embodiment, the method further comprises an abort step in which the instruction may be aborted if a measured real evolvement of traffic deviates from the forecasted evolvement of traffic more than a predetermined amount. E.g. if a vehicle that was forecasted to enter into a crossing took an exit before the crossing, or if a vehicle that was forecasted to have a certain speed has a speed that is 10%, 20% or 30% lower or higher speed.

In one embodiment, the method further comprises a step of estimating the overall traffic flow of the area based on the forecasted traffic and wherein the suggestions further are based on forecasting whether the overall traffic flow is increased if the suggestions are accepted compared to if they are rejected.

In one embodiment, the method further comprises a step of estimating a braking distance based on the perceived attributed of the vehicle wherein projecting the traffic further comprises estimating a projected collision speed between a first vehicle and a subsequent second vehicle in case of an instant braking of the first vehicle and wherein guiding autonomous vehicles further is based on said projected collision speed and wherein suggestions are provided for which the collision speed is decreased assuming that the suggestions are accepted compared to assuming that the suggestions are rejected and the set of instructions are also based on an experienced safety of vulnerable road users.

Moreover, any feature or functionality described in relation to the system is also relevant for the method, and equally combinable. E.g., the identifying means being described to be capable of detecting a color or shape, is also disclosing the method of identifying the vehicle by color or shape.

Further advantages and advantageous features of the invention are disclosed in the following description and in the dependent claims.

BRIEF DESCRIPTION OF DRAWINGS

With reference to the appended drawings, below follows a more detailed description of embodiments of the invention cited as examples.

DETAILED DESCRIPTION

Figure 1:
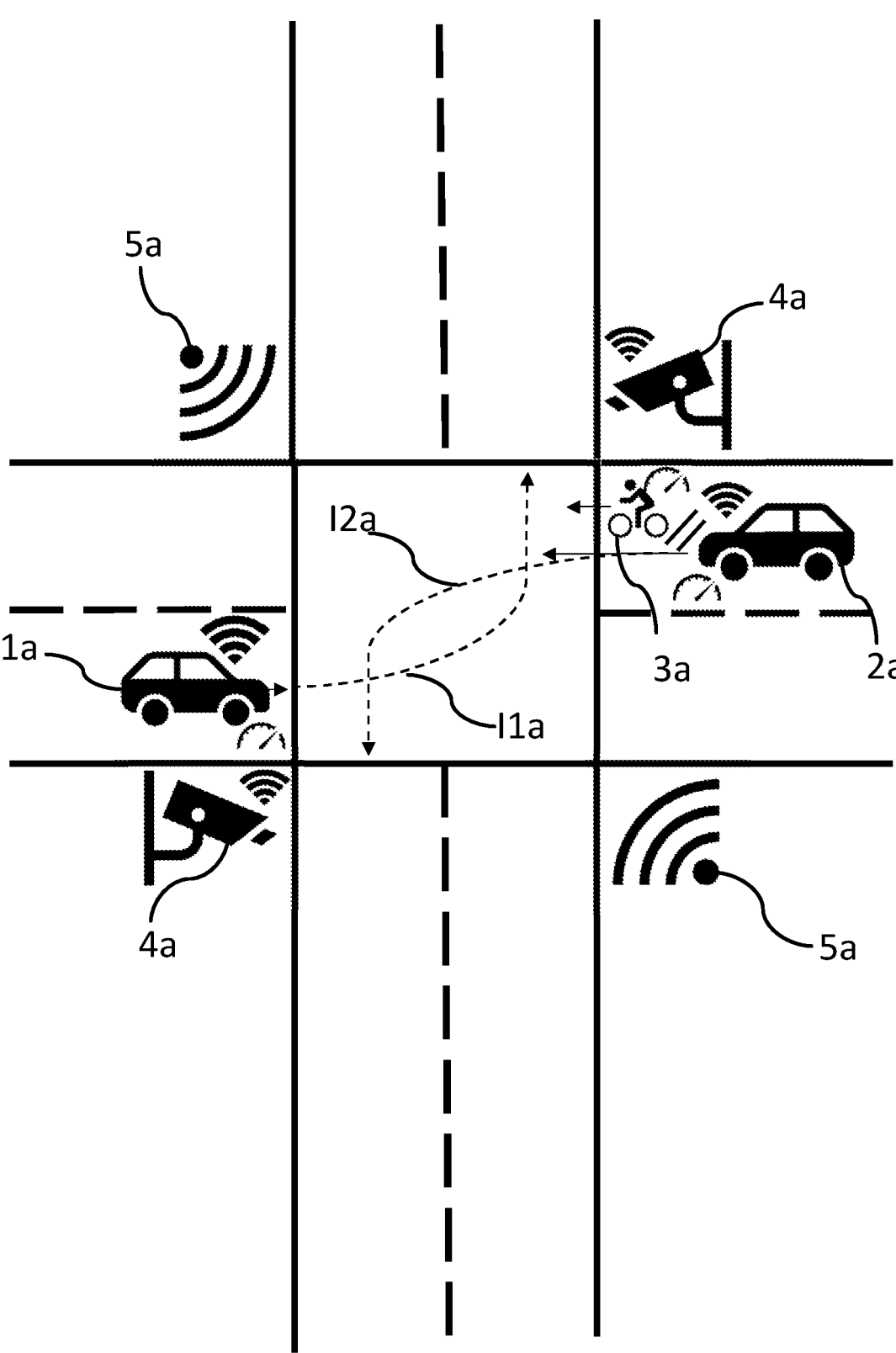
In FIG. 1 a projection model of an intersection is illustrated according to one embodiment of the invention.

The present inventive concept will be described more fully hereinafter with reference to the accompanying drawings, in which preferred embodiments of the invention are shown. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. In the drawings, like numbers refer to like elements.

Figure 2:
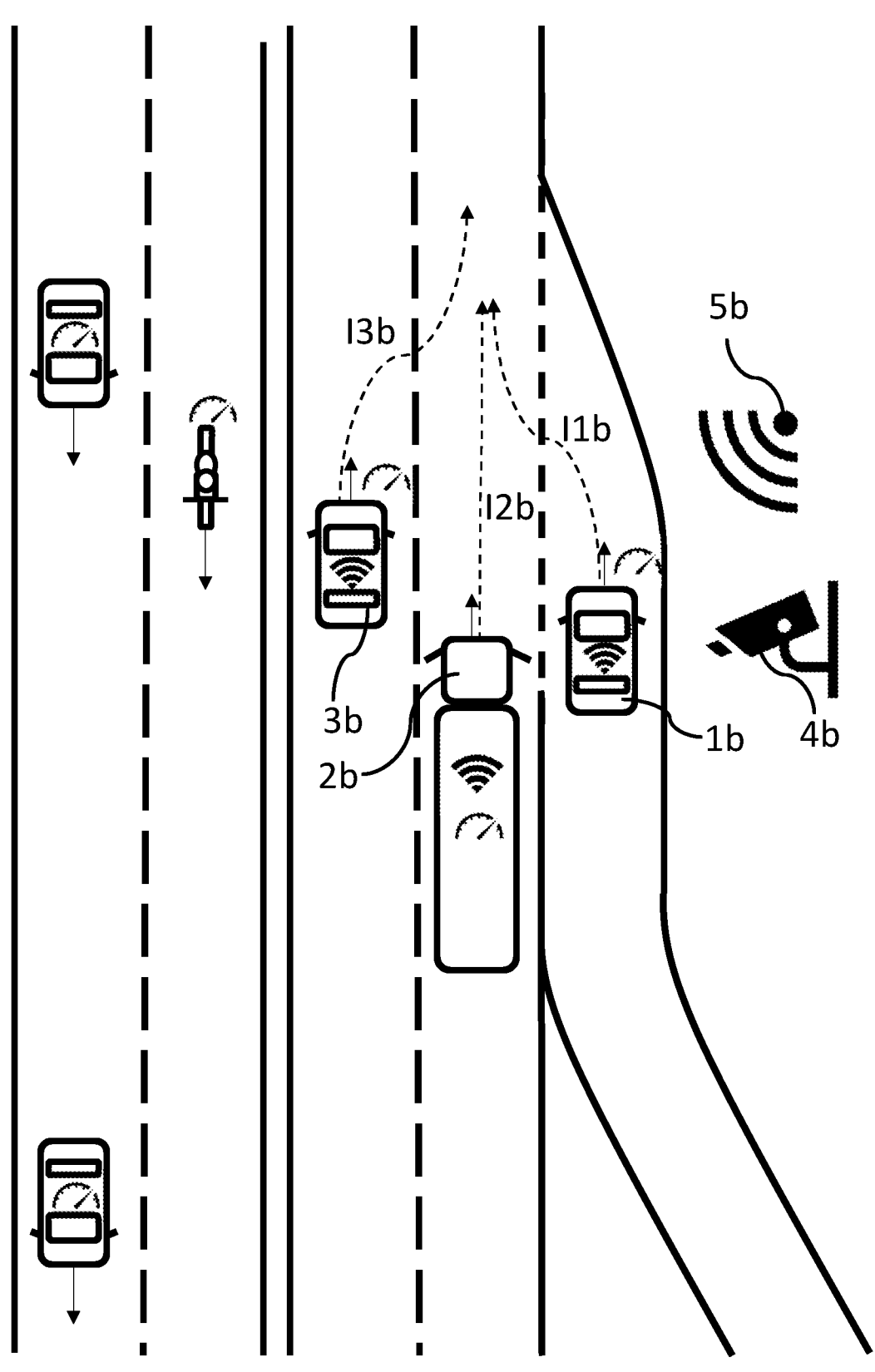
In FIG. 2 a projection model of a highway with a connected ramp is illustrated according to one embodiment of the invention.
Figure 3:
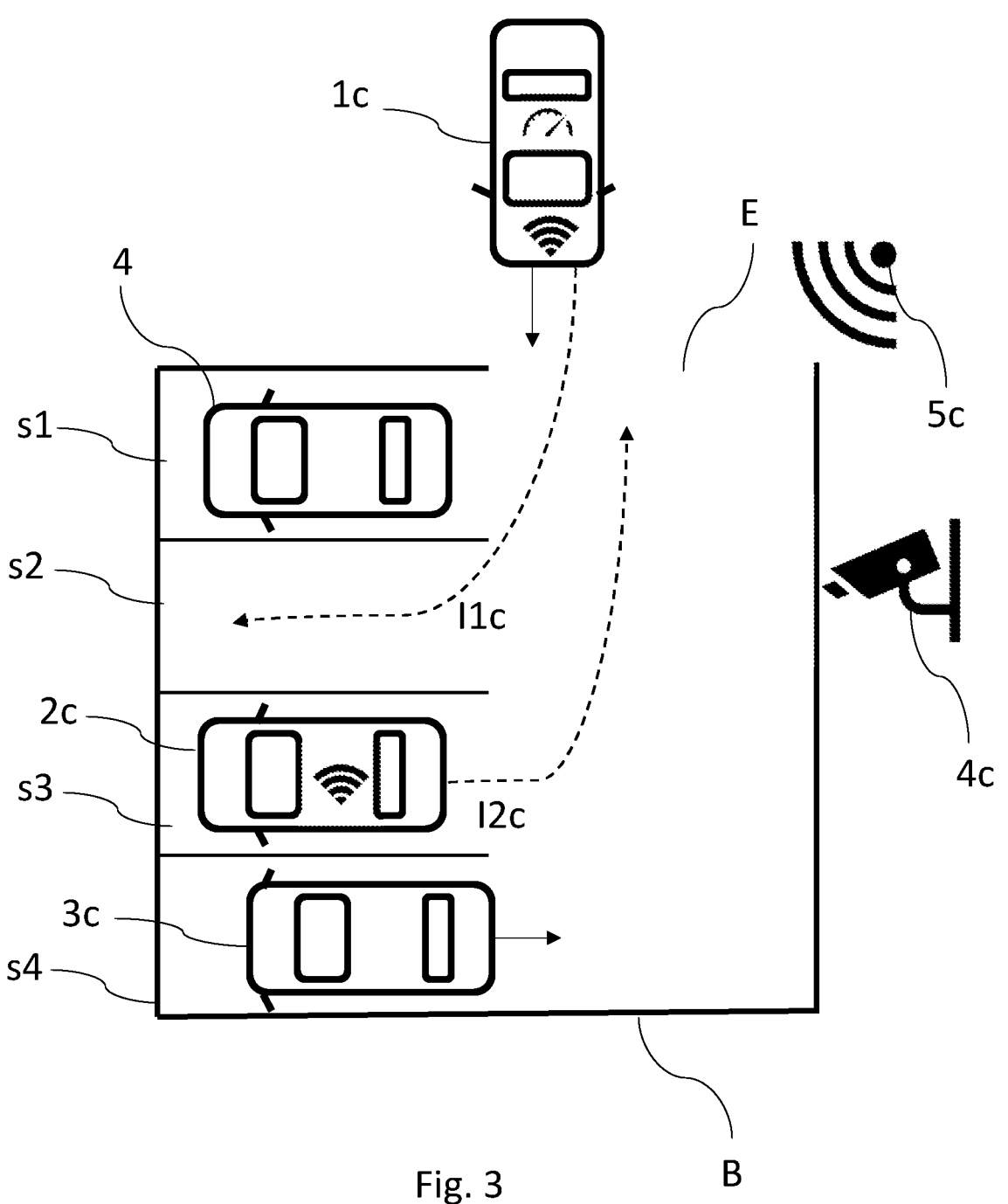
In FIG. 3 a projection model of parking lot is illustrated according to one embodiment of the invention.

In FIG. 1 there is illustrated an intersection where a system, according to one embodiment of the inventive concept, is implemented. Two vehicles 1a, 2a are seen approaching the intersection from opposite directions. In FIG. 2 there is illustrated, a highway, where the system is implemented according to another embodiment, with one truck 2b and one car 1b driving in one direction and one car and one motorcycle driving in the opposite direction. There is also illustrates a ramp onto which one vehicle 1b is approaching the highway. In FIG. 3 there is illustrated a parking lot with two automated vehicles 1c, 2c and two conventional vehicles 3c, 4. The movement and the position of the vehicles are tracked by 3D measuring cameras 4a, 4b, 4c. In an alternative embodiment the movement and position of the are tracked by a LIDAR system. The position and movement are communicated to a computing device, which may be a server. The computing device may work as aggregation means, aggregating the information communicated to the computing device. The movements can be divided into a speed and a direction of travel, marks by the solid line arrows. The computing device has access to a map over an area, of which the intersection or the highway is a portion. The computing device aggregates the position onto the map. The aggregated data and the road map together form a projection model of the area. FIGS. 1, 2 and 3 illustrate embodiments of how one aspect of the projection model can be displayed. Through a program installed on the computing device vehicles are placed onto the road map together with the movement of direction and speed of each of the vehicles. The projection model can be monitored by an operator. The road map can be updated e.g., adjust for changes of the road network or maintenance works.

Illustrated in FIG. 1, by 3D measuring means measuring the dimensions of the vehicles, the computing device characterizes vehicle 1a and vehicle 2a as cars, and vehicle 3a as a bicycle. Vehicle 1a, 2a are connected to the system and communicate an intended route, respectively to a wireless receiver 5a that is located in the vicinity of the intersection. The vehicles also communicate information about their current speed and registrations from sensors of the vehicles such as measured distance to other vehicles, objects and road structures, like pavement and the center line of a road onto which the vehicles drive. The wireless receivers 5a are connected to the computing device. In the illustrated embodiment sensors of the connected vehicle 2a detects and registers the position and movement of the bicycle 3a. Outgoing from received information about the vehicles position and speed from the 3D measuring means 4a and from the vehicles 1a, 2a themselves the system validates the information. The computing device characterizes information about the movement and position of a vehicle as having high reliability if the deviation between information communicated by the 3D measuring means and the vehicles is low and the reliability as low if said deviation is high.

The computing device works as a forecasting means forecasting the evolvement of the movement and position of all vehicles 1a, 2a in the area, with the assumption that the vehicles that have communicated their intended route 11a, 12a, will aim to follow that. The evolvement of movement and position of vehicles that are not connected to the system, like the bicycle 3a, and thereby have not communicated their intended routes to the system, is also forecasted. The forecasting is enabled by machine learning and registering the movement and position of the vehicles along with the communicated intended routes during a time and iteratively or continuously improving the forecasts. Outgoing from the forecasted evolvement the computing device estimates a total vehicle efficiency for the area. The total driving efficiency is described by one or several numbers or binary values. The numbers may be such as safety relating to risk for collision or accident, traffic through put and fuel efficiency. The numbers may be weighted, according to a weight correspondence into a total driving efficiency. For example, safety may be weighted relatively high and fuel efficiency relatively low. The weights may be linear or non-linear. Some non-linear weighting correspondences may result in that impairments of the safety to a certain extent results in such a low traffic efficiency number that it cannot be compensated by an improvement of the fuel efficiency or traffic through put.

Moreover, through machine learning and/or numerical mathematical optimization methods, the computing device, generating instructions for the connected vehicles, by which the total driving efficiency, according to a corresponding forecasted evolvement, is increased, preferably optimized. The instructions may comprise an instruction route and specify how the vehicles should drive through the intersection.

The vehicles 1a, 2a communicate their intended routes 11a, 12a, respectively, which for both vehicles is to drive to the left. The first car 1a and second car 2a, which are connected, communicates their positions by transmitting devices of the vehicles to receiving devices 5a of the system along with an identity data associated with the identity of the cars 1a, 2a. The 3D measuring means 4a measures the position and dimensions of the vehicles and communicates it to the computing device. The system associates the measured data from said imaging with the identity data of the cars due to matching of position measured by imaging and communicated from the cars or imaged attributes matching one aspect of the identity data.

The system forecasts the evolvement of the intersection, and forecasts interference between the first car 1a and second car 2a and between the bicycle 3a and the second car 2a. Since the bicycle 3a is unconnected the system associates the forecasted movement of the bicycle 3a with higher uncertainty than the connected cars 1a, 2a. The system estimates a total driving efficiency for said evolvement considering e.g., the safety, fuel consumption and traffic flow of all vehicles. Based thereon, the system gives the first car 1a instructions to await the bicycle 3a and the second car 2a, instructions the system associate with a higher total driving efficiency, mainly due to the estimated lower risk of collision with the bicycle 3a, resulting in a higher total driving efficiency. The instructions are received by receiving devices of the connected automated vehicles, 1a, 2a, respectively. Due to pre-set settings on the first car the system receives an acceptance from the first car 1a to drive according to said instructions. It followingly gives the second car 2a instructions to drive to the left before the first car, but with a speed which is considered safe considering the uncertainty of the route of the bicycle 3a and the possible interference with said bicycle 3a.

At the highway illustrated in FIG. 2 one connected autonomous car 1b approaches the highway on the ramp and communicates its intended route 11b to drive onto the right lane of the highway. One autonomous car 3b and autonomous truck 2b driving on the right and left lane of the highway, respectively, are also connected to the system. They also communicate their intended routes 12b, 13b for the truck to continue in the right lane and for the car 3b which is overtaking the truck 2b, to switch to the right lane. The system measures and identifies the vehicles in a similar manner as for the intersection. The 3D measuring means 4b measure the dimensions, position and movement of the vehicles 1b, 2b, 3b. By measuring the dimensions, the system characterizes the vehicle in the right lane as a truck. The system forecasts the evolvement of the traffic estimates a total driving efficiency. All three vehicles are forecasted to interfere with each other due to their intended routes, 11b, 12b, 13b, contributing to a relatively low driving efficiency. The system generates instructions for all three vehicles as follows, for the truck 2b to decrease its speed in order for the vehicle 1b on the ramp to merge into the right lane of the highway, considering the comparably decreased acceleration capacity of the truck 2b. The system generates instructions for which the total driving efficiency of a corresponding forecasted evolvement improved. The car 3b in the left lane receives instructions to stay in said left lane in order not having to interfere with the merging car 1b. The merging vehicle 1b receives instructions to merge into the right lane and increase its speed to some extent in order for the truck to not having to decrease its speed to a too large extent considering the fuel consumption of the truck. When the system has received acceptance from said vehicles the vehicles 1b, 2b, 3b are set to follow said instructions. The system thereby causes the vehicles to follow the instructions. Before acceptance the vehicles are set to drive along routes for which the uncertainty of the driving routes of other possibly interfering vehicles are considered. For example, the vehicle on the ramp is not set to merge into the right lane before the truck before acceptance of the truck in the right lane to slow down. Before that, the vehicle on the ramp is set to drive in a manner in which the truck cannot be assumed to slow down, implying that the car must have enough safety margins to await the truck and merge in after it, like the manner of a conventional autonomous vehicle.

In FIG. 3, a parking lot is illustrated, which one autonomous vehicle 1c is approaching. The parking lot has four parking spots s1, s2, s3, s4 and is confined with a barrier B except for at its Entry and Exit passage E. Onto the parking lot, a connected autonomous vehicle 2c is parked on the third spot s3 counted from the passage and one conventional vehicle 3c is backing out from the fourth and last spot s4 of the lot, counted from said passage E. On the first spot s1 another conventional vehicle 4 is parked. The vehicles 1c, 2c, 3c, 4, and their movement, are imaged by the 3D measuring means 4c and the connected autonomous vehicles 1c, 2c communicate with the transceiver and receiver device 5c of the system. The system identifies vehicles 1c, 2c as connected autonomous vehicles, based on their attributes indicating their identity and/or a signal, from which their identities is derivable, transmitted to the receiver device 5c. The approaching vehicle 1c communicates its intended route 11c which is to drive to the second spot s2. The autonomous vehicle 2c on the third spot s3, communicate its intended route which is to back out from the spot and leave the parking lot through the passage E. The intended driving routes 11c, 12c, and data from imaging the vehicles by the 3D measuring means are communicated to a computing device and aggregated into a projection model, with a map of an area comprising the parking lot. Based on the aggregated data, the system forecasts an evolvement of the traffic. The forecasted evolvement is associated with interference between the vehicles 1c, 2c and 3c. Based on the forecasted evolvement and the aggregated data the system generates sets of instructions to the connected autonomous vehicles 1c and 2c. As an example, the system may instruct vehicle 2c to await the vehicle 3c to back out, in order not having to interfere with vehicle 3c, which may be safer and more efficient than if vehicle 2c and 3c would back out from their spots s3, s4 simultaneously. The system may, further, instruct autonomous vehicle 1c to await the vehicles 2c, 3c to back out from their spots s3, s4, respectively, before entering the parking lot to reduce interference with said vehicle 2c and 3c. In order to facilitate an efficient use of parking spots, the system may further instruct vehicle 1c to take the fourth and last spot s4 instead of the second spot s2, according to its intended route 11c. The vehicle may be able to communicate whether it accepts to be redirected to another spot than intended or if it must take a specific spot, e.g., due to a need of the spot being adapted for disabled users or that the user has rented a specific spot.

Figure 4:
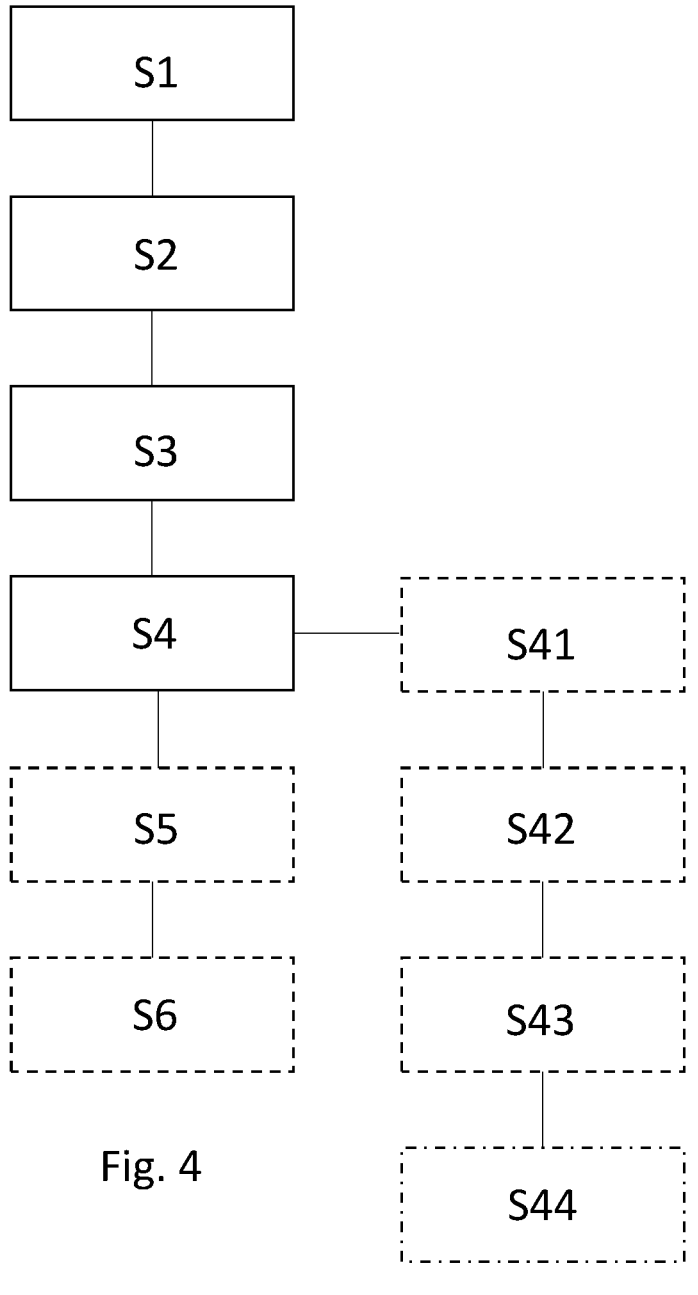
In FIG. 4 a flow chart of steps of a method of controlling at least one autonomous vehicle within an area is illustrated.

In FIG. 4, a flow chart is illustrated over a method of controlling at least one autonomous vehicle within an area. The method comprises a first step S1 of detecting at least one autonomous vehicle and its position by 3D measuring. Detecting the at least one vehicle and its position and movement may be performed by stereo cameras, time of flight cameras, a LIDAR system, or any other 3D measuring means for which at least a portion of the area is within the range.

The 3D measuring means may also measure the attribute and/or dimensions of the at least one vehicle. Based on the attribute and/or dimensions, a computing device determines what type of vehicle there is such as truck, car or bicycle. There is also determined which of the pedestrians that are vulnerable road users. The 3D measuring means also detects other objects such as pedestrians and road structures.

The method further comprises a step of obtaining S2 the identity of the at least one vehicle. The identity may be obtained through 3D measuring by the 3D measuring means, measuring attributes of the at least one vehicle such that color shape and dimensions, and/or by the at least one autonomous vehicle, transmitting a wireless signal from which its identity is derivable.

A vehicle measured by the 3D measuring means may be associated with an obtained identity by a computing device. The method further comprises a step of aggregating S3 the information of the position and movement of the autonomous vehicle with a road map of the area.

Aggregating the information may be performed by the computing device, to which the road map is accessible. The measured position is associated with a position on the road map. Connected autonomous vehicles transmit their intended driving routes to a receiving device connected to the computing device that performs a step of receiving S41 said intended route.

The computing device performs a step of forecasting S42 an evolvement of the traffic based on the aggregated information. Associated with the forecasted evolvement a step is performed of estimating S43 an overall traffic flow of the area. Moreover, a step is performed of estimating S44 a breaking distance for each vehicle, based on its measured speed and dimensions. Based on the breaking distance there is estimated a collision speed between subsequent vehicles should a vehicle instantly break. The computing device estimates a total driving efficiency for the at least one autonomous vehicle. The total driving efficiency considers safety, e.g., relating to said estimated collision speed between subsequent vehicles. The total driving efficiency may also be based on fuel efficiency and/or traffic through put. The fuel efficiency may be based on speed of the at least one vehicle and the identified type of the vehicle. The total driving efficiency is also based on the forecasted evolvement. The computing device is guiding S4 the at least one vehicle by generating a set of instructions based on said total driving efficiency for the at least one autonomous vehicle and at least one additional vehicle measured by the 3D measuring means. The generated instructions may also be based on said intended driving routes. The instructions may specify exactly with what speed and direction the vehicle should drive during an interval or at specific time points. The computing device may perform a step of transmitting, by a transmitting device, the set of instruction to a receiving device of the at least one vehicle. The at least one vehicle may perform the step of selecting S5 whether to accept or reject the set on instructions, which may be based on pre-set settings made by a user. The pre-set instructions may specify what type of instructions the vehicle should accept. The acceptance may be transferred back to the computing device which may be causing S6 the at least one autonomous vehicle to follow said instructions through remote steering.

The invention claimed is:

1. A system for guiding at least one autonomous vehicle within an area, the system comprising:
    at least one 3D-measuring sensor operatively connected to a computing system, wherein the at least one 3D-measuring sensor is configured to detect the at least one autonomous vehicle and at least one object within the area, and is further configured to detect the position and movement of the at least one autonomous vehicle and the at least one object;
    the computing system comprising one or more processors configured to:
        obtain an identity of the at least one autonomous vehicle;
        access a road map of the area;
        aggregate information of the position and movement of the at least one autonomous vehicle and the at least one object with the road map of the area;
        generate a set of instructions for the at least one autonomous vehicle, based on a total driving efficiency for said at least one autonomous vehicle and at least one additional vehicle, wherein the total driving efficiency is based on the aggregated information of the position and movement of the at least one autonomous vehicle and the at least one object; and
        transmit the set of instructions for guiding the at least one autonomous vehicle,
    wherein the total driving efficiency comprises at least one of: fuel consumption, traffic flow, speed steadiness, traffic through-put of the area, experienced and real safety for vulnerable road users, accessibility for prioritized vehicles, buses, and emergency vehicles, area density of parked vehicles, and access to parking spots.

2. The system according to claim 1, wherein the one or more processors of the computing system are further configured to receive an intended driving route from said at least one autonomous vehicle, and wherein said set of instructions further are generated based on said intended driving route.

3. The system according to claim 2, wherein the at least one autonomous vehicle is a first autonomous vehicle and the at least one additional vehicle is a second autonomous vehicle, wherein the set of instructions is a first set of instructions, and wherein the one or more processors of the computing system are further configured to transmit a second set of instructions to the second autonomous vehicle based on said intended driving route and are further configured to give the second autonomous vehicle a choice to accept the set of instructions and to further generate the first set of instructions for the first autonomous vehicle based on said choice.

4. The system according to claim 2, wherein the one or more processors of the computing system are further configured to forecast an evolvement of the movement of the at least one autonomous vehicle and the at least one additional vehicle in the area outgoing from said aggregated information and said intended driving route, and wherein said set of instructions further are generated based on said forecasted evolvement.

5. The system according to claim 4, wherein the forecasted evolvement is estimated based on imaging the movement of the at least one autonomous vehicle and the at least one additional vehicle and machine learning based on the imaged movement so as to correlate the set of instructions with the forecasted evolvement.

6. The system according to claim 2, wherein the set of instructions and/or the intended driving route comprise a continuously varying direction and speed for a vehicle or a list of directions and speeds together with corresponding time points during a time interval.

7. The system according to claim 1, wherein the one or more processors of the computing system are further configured to obtain said identity of the at least one autonomous vehicle through 3D imaging, imaging at least one attribute such as color or shape of said autonomous vehicle or by receiving positioning data from the at least one autonomous vehicle.

8. The system according to claim 1, wherein the one or more processors of the computing system are further configured to:

determine whether the at least one object is a vulnerable road user, and if so, identify whether the at least one object includes any extra vulnerable road users, such as wheelchair users, elderly people, and children, aggregate said vulnerable road user information thereabout, and generate the set of instructions based on said vulnerable road user information.

9. The system according to claim 1, wherein the area comprises a roundabout, an intersection, a parking spot, a parking lot, or a motorway ramp, bridge, tunnel, or other continuous road stretch.

10. The system according to claim 1, wherein the 3D-measuring sensor comprises at least one of a stereo camera, a radar, a time of flight camera, and a LIDAR system.

11. A computer-implemented method for guiding at least one autonomous vehicle within an area, the method comprising:

detecting at least one autonomous vehicle and at least one object within the area and its position and movement by 3D measuring;

obtaining the identity of the at least one autonomous vehicle;

aggregating information of the position and movement of the autonomous vehicle and the object with a road map of the area; and guiding the at least one autonomous vehicle in the system by generating a set of instructions to said at least one vehicle based on a total driving efficiency for said at least one autonomous vehicle and at least one additional vehicle, wherein the total driving efficiency comprises at least one of: fuel consumption, traffic flow, speed steadiness, traffic through-put of the area, experienced and real safety for vulnerable road users, accessibility for prioritized vehicles, buses, and emergency vehicles, area density of parked vehicles, and access to parking spots.

12. The method according to claim 11, further comprising a step of receiving an intended driving route from the at least one autonomous vehicle, and wherein the set of instructions are generated further are based on said intended driving route.

13. The method according to claim 11, further comprising a step of forecasting the evolvement of the traffic of the area outgoing from said aggregated information and said intended driving route, and wherein said set of instructions further are generated based on said forecasted evolvement of the traffic.

14. The method according to claim 13, further comprising a step of estimating the overall traffic flow of the area based on the forecasted traffic, and wherein the suggestions further are based on projecting whether the overall traffic flow is increased if the suggestions are accepted compared to if they are rejected.

15. The method according to claim 14, further comprising a step of estimating a braking distance based on a perceived attribute of the vehicle, wherein projecting the traffic further comprises estimating a projected collision speed between a first vehicle and a subsequent second vehicle in case of an instant braking of the first vehicle and wherein guiding autonomous vehicles further is based on said projected collision speed, and wherein suggestions are provided for which the collision speed is decreased assuming that the suggestions are accepted compared to assuming that the suggestions are rejected and the set of instructions are also based on an experienced safety of vulnerable road users.

16. The method according to claim 11, wherein the 3D measuring is performed using at least one of a stereo camera, a radar, a time of flight camera, and a LIDAR system.

\* \* \* \* \*